United States Patent
Shabgard et al.

(10) Patent No.: US 12,187,625 B2
(45) Date of Patent: Jan. 7, 2025

(54) ZERO LIQUID DISCHARGE EUTECTIC FREEZE DESALINATION WITH INTERMEDIATE COLD LIQUID

(71) Applicant: The Board of Regents of the University of Oklahoma, Oklahoma City, OK (US)

(72) Inventors: Hamidreza Shabgard, Norman, OK (US); Ramkumar N. Parthasarathy, Norman, OK (US); Jie Cai, Norman, OK (US)

(73) Assignee: The Board of Regents of the University of Oklahoma, Oklahoma City, OK (US)

( * ) Notice: Subject to any disclaimer, the term of this patent is extended or adjusted under 35 U.S.C. 154(b) by 851 days.

(21) Appl. No.: 17/095,675

(22) Filed: Nov. 11, 2020

(65) Prior Publication Data

US 2021/0139346 A1  May 13, 2021

Related U.S. Application Data

(60) Provisional application No. 62/933,932, filed on Nov. 11, 2019.

(51) Int. Cl.
*C02F 1/22* (2023.01)
*C02F 1/26* (2023.01)
*C02F 101/10* (2006.01)

(52) U.S. Cl.
CPC ............ *C02F 1/265* (2013.01); *C02F 1/22* (2013.01); *C02F 2101/10* (2013.01);
(Continued)

(58) Field of Classification Search
CPC ........ C02F 1/22; C02F 1/265; C02F 2101/10; C02F 2209/02; C02F 2301/10; C02F 2305/00
See application file for complete search history.

(56) References Cited

U.S. PATENT DOCUMENTS 4,112,702 A * 9/1978 Smirnov .................. B01D 9/04
                                                    62/343
4,654,064 A * 3/1987 Cheng ................. B01D 9/0036
                                                    62/937

OTHER PUBLICATIONS

Chang, J., Zuo, J., Lu, K-J, Chung, T-S, Freeze desalination of seawater using LNG cold energy, Water Research vol. 102, 282-293, 2016. (Year: 2016).*

(Continued)

*Primary Examiner* — Chester T Barry
(74) *Attorney, Agent, or Firm* — Crowe & Dunlevy, P.C.

(57) ABSTRACT

A method for desalinating a brine includes the use of a cooled intermediate-cold-liquid (ICL), which combines with the brine in a crystallization or freezing tank to produce a slurry of ice, brine, and ICL. The method includes steps for separating the ICL, ice and brine, and returning the separated ICL to the source of cooled ICL tank. The method concludes with the steps of passing the separated brine to the crystallization tank, and melting the separated ice to form desalinated water. The method is significant in that it produces desalinated liquid water and solid salts. The combination of superior heat transfer with high quality purified water and competitive desalination economy makes the disclosed freeze desalination technology an attractive solution for desalination of highly concentrated brines produced in a variety of industries, including but not limited to the oil and gas industry and reject brine management.

8 Claims, 4 Drawing Sheets

(52) U.S. Cl.
CPC ...... *C02F 2209/02* (2013.01); *C02F 2301/10* (2013.01); *C02F 2305/00* (2013.01)

(56) References Cited

OTHER PUBLICATIONS

Van der Ham, F., Witkamp, G.J., de Graauw, J., van Rosmalen, G.M., Eutectic freeze crystallization: Application to process streams and waste water purification, Chemical Engineering and Processing 37 207-213, 1998. (Year: 1998).*
A. Alkhalidi et al., Experimental investigation of water desalination using freezing technology, Case Stud. Therm. Eng. 28 (2021) 101685. https://doi.org/10.1016/j.csite.2021.101685.
A. E. Snyder, Desalting Water by Freezing, Scientific American. 207 (1962) 41-47. https://www.jstor.org/stable/24936383.
A. Eghtesad et al., Numerical investigation and optimization of indirect freeze desalination, Desalination. 481 (2020) 114378. https://doi.org/10.1016/j.desal.2020.114378.
A. Najim, A review of advances in freeze desalination and future prospects, Npj Clean Water. 5 (2022). https://doi.org/10.1038/s41545-022-00158-1.
A. Zambrano et al., Freeze desalination by the integration of falling film and block freeze-concentration techniques, Desalination. 436 (2018) 56-62. https://doi.org/10.1016/j.desal.2018.02.015.
Arora A.P.S. et al., An Investigation of the Freezing of Supercooled Liquid in Forced Turbulent Flow Inside Circular Tubes, 16 Int. J. Heat Mass Trans. 2077-2084 (1973).
B. Kalista et al., Current development and future prospect review of freeze desalination, Desalination. 447 (2018) 167-181. https://doi.org/10.1016/j.desal.2018.09.009.
B. Verbeek, Eutectic freeze crystallization on sodium chloride—analysis of a full experimental cycle, Msc. Thesis, Technical University of Delf, 2011. http://resolver.tudelft.nl/uuid:2d3bca49-1f4f-41f1-a2aa-b821712d82ec.
B.D. Knodel et al., Heat transfer and pressure drop in ice-water slurries, Applied Thermal Engineering. 20 (2000) 671-685. https://doi.org/10.1016/S1359-4311(99)00046-0.
Barduhn A.J., The State of the Crystallization Processes for Desalting Saline Waters, Desalination (5), 173-184 (1968).
C. Xie et al., A direct contact type ice generator for seawater freezing desalination using LNG cold energy, Desalination. 435 (2018) 293-300. https://doi.org/10.1016/j.desal.2017.04.002.
C.S. Luo et al., Experimental study on factors affecting the quality of ice crystal during the freezing concentration for the brackish water, Desalination. 260 (2010) 231-238. https://doi.org/10.1016/j.desal.2010.04.018.
C.W. Ong et al., Technical and economic evaluation of seawater freezing desalination using liquefied natural gas, Energy. 181 (2019) 429-439. https://doi.org/10.1016/j.energy.2019.05.193.
D. Chen et al., Experimental study on seawater desalination through supercooled water dynamic ice making, Desalination. 476 (2020) 114233. https://doi.org/10.1016/j.desal.2019.114233.
D. Weber et al., Raman spectroscopy as a process analytical technology to investigate biopharmaceutical freeze concentration processes, Biotechnol. Bioeng. 118 (2021) 4708-4719. https://doi.org/10.1002/bit.27936.
E.T. Igunnu et al., Produced water treatment technologies, Int. J. Low-Carbon Technol. 9 (2014) 157-177. https://doi.org/10.1093/ijlct/cts049.
F.E. Genceli, Scaling-up eutectic freeze crystallization, PhD Thesis, Technical University of Delf, 2008. http://resolver.tudelft.nl/uuid:c64d84d8-6552-4d3c-9c02-1d511c689c43.
G. Nebbia et al., Early Experiments on Water Desalination by Freezing, Desalination. 5 (1968). https://doi.org/10.1016/S0011-9164(00)80191-5.
Gelest, (2023) https://www.gelest.com/product/DMS-T01.5/.
H. Jaster et al., Enhancement of antioxidant activity and physicochemical properties of yogurt enriched with concentrated strawberry pulp obtained by block freeze concentration, Food Res. Int. 104 (2018) 119-125.
H. Jayakody et al., Numerical investigation of indirect freeze desalination using an ice maker machine, Energy Convers. Manag. 168 (2018) 407-420. https://doi.org/10.1016/j.enconman.2018.05.010.
H. Kumano et al., Formulation of the latent heat of fusion of ice in aqueous solution, Int. J. Refrig. 32 (2009) 175-182. https://doi.org/10.1016/j.ijrefrig.2008.07.010.
H. Yang et al., Study on combined freezing-based desalination processes with microwave treatment, Desalination. 475 (2020) 114201. https://doi.org/10.1016/j.desal.2019.114201.
H. Zhang et al., Freezing desalination: Heat and mass validated modeling and experimental parametric analyses, Case Stud. Therm. Eng. 26 (2021) 101189. https://doi.org/10.1016/j.csite.2021.101189.
H.F. Wiegandt et al., Ice crystallization developments for the butane direct-contact process, Desalination. 67 (1987) 107-126. https://doi.org/https://doi.org/10.1016/0011-9164(87)90237-2.
H.M. Abdelmoaty, et al., Performance analysis of salt reduction levels in indirect freeze desalination system with and without magnetic field exposure, Desalination. 508 (2021) 115021. https://doi.org/10.1016/j.desal.2021.115021.
Heat transfer applications using 3MTM NovecTM engineered fluids, 2013. https://multimedia.3m.com/mws/media/10919970/3m-novec-engineered-fluids-for-heat-transfer-line-card.pdf.
I. Janajreh et al., Freeze desalination☐: Current research development and future prospects, Water Res. 229 (2023) 119389. https://doi.org/10.1016/j.watres.2022.119389.
Kreshneck G.C. et al., The Effect of D2O on the Thermal Stability of Proteins. Thermodynamic Paramters for the Transfer of Model Compounds from H2O to D2O., 69 J. Phys. Chem. 3132-3144 (1965).
L. Erlbeck et al., Investigation of a novel scraped surface crystallizer with included ice-pressing section as new purification technology, Sep. Purif. Technol. 228 (2019) 115748. https://doi.org/10.1016/j.seppur.2019.115748.
L. Erlbeck et al., Investigation of the depletion of ions through freeze desalination, Desalination. 407 (2017) 93-102. https://doi.org/10.1016/j.desal.2016.12.009.
M. Hasan et al., Salt recovery from wastewater by air-cooled eutectic freeze crystallization, Chem. Eng. J. 326 (2017) 192-200. https://doi.org/10.1016/j.cej.2017.05.136.
M. Landau et al., Assessment of crystalliser designs for a butane freeze desalination process, Desalination. 3 (1967) 318-329. https://doi.org/10.1016/S0011-9164(00)80161-7.
M. Shafipour Rahman et al., Freezing-melting desalination process, in: Desalin. Water from Water, 2014: pp. 473-501.
M.M. Conde et al., Molecular dynamics simulations of freezing-point depression of TIP4P/2005 water in solution with NaCl, J. Mol. Liq. 261 (2018) 513-519. https://doi.org/10.1016/j.molliq.2018.03.126.
M.S. Rahman et al., Freezing-melting process and desalination: I. review of the state-of-the-art, Sep. Purif. Rev. 35 (2006) 59-96. https://doi.org/10.1080/15422110600671734.
Niedermeier D. et al., Heterogeneous ice nucleation: exploring the transition from stochastic to singular freezing behavior, 11 Atmos Chem Phys 767-8775 (2011).
P. Gorbounov, M. Battistin, E. Thomas, Comparison of liquid coolants suitable for single-phase detector cooling, (2016) 1-17.
P. Sahu, S. Krishnaswamy, N.K. Pande, Process intensification using a novel continuous U-shaped crystallizer for freeze desalination, Chem. Eng. Process.—Process Intensif. 153 (2020) 107970. https://doi.org/10.1016/j.cep.2020.107970.
P.M. Williams et al., Technology for freeze concentration in the desalination industry, Desalination. 356 (2015) 314-327. https://doi.org/10.1016/j.desal.2014.10.023.
PSF-1.5 cSt silicone heat transfer fluid product information, 2023. https://doi.org/https://www.clearcoproducts.com/pdf/volatile/NP-PSF-1_5cSt.pdf.

(56) References Cited

OTHER PUBLICATIONS

S. Moharramzadeh, S.K. Ong, J. Alleman, K.S. Cetin, Parametric study of the progressive freeze concentration for desalination, Desalination. 510 (2021) 115077. https://doi.org/10.1016/j.desal.2021.115077.

S. Samsuri et al., Progressive freeze concentration for volume reduction of produced water and biodiesel wastewater, Chem. Eng. Technol. 42 (2019) 1764-1770. https://doi.org/10.1002/ceat.201800505.

S. Samsuri et al., Spiral finned crystallizer for progressive freeze concentration process, Chem. Eng. Res. Des. 104 (2015) 280-286. https://doi.org/10.1016/j.cherd.2015.06.040.

Van der Ham F. et al., Eutectic freeze crystallization simultaneous formation and separation of two solid phases, 198/199 J. Crystal Growth, 744-748 (1999).

Veil J. (2015), Ground Water Protection Council Report.

W. Gibson et al., Spray freezer and pressurized counterwasher for freeze desalination, Desalination. 14 (1974) 249-262. https://doi.org/10.1016/S0011-9164(00)80258-1.

W. Lin et al., A seawater freeze desalination prototype system utilizing LNG cold energy, Int. J. Hydrogen Energy. 42 (2017) 18691-18698. https://doi.org/10.1016/j.ijhydene.2017.04.176.

Y. Liu et al., Desalination of seawater by spray freezing in a natural draft tower, Desalination. 496 (2020) 114700. https://doi.org/10.1016/j.desal.2020.114700.

Y. Mandri et al., Parametric study of the sweating step in the seawater desalination process by indirect freezing, Desalination. 269 (2011) 142-147. https://doi.org/10.1016/j.desal.2010.10.053.

* cited by examiner

ZERO LIQUID DISCHARGE EUTECTIC FREEZE DESALINATION WITH INTERMEDIATE COLD LIQUID

RELATED APPLICATIONS

This application claims the benefit of U.S. Provisional Patent Application Ser. No. 62/933,932 filed Nov. 11, 2019 entitled, "Zero Liquid Discharge Eutectic Freeze Desalination with Intermediate Cold Liquid," the disclosure of which is hereby incorporated by reference as if set forth in its entirety herein.

STATEMENT OF GOVERNMENT FUNDING

This invention was made with government support under Contract Number DE-AR0001069 awarded by the Department of Energy. The government has certain rights in the invention.

BACKGROUND

Fresh water resources are becoming increasingly scarce due to diminishing resources and increasing consumption. At the same time, waste water management imposes a challenge in various municipal and industrial sectors. As an example, the oil and gas industry consumes large volumes of fresh water during the recovery of hydrocarbons while producing large volumes of waste water that is contaminated with a variety of minerals, heavy metals, and organic compounds. Modern oil and gas extraction techniques, including hydraulic fracturing, produce particularly large volumes of contaminated waste water.

Management of the produced water presents a significant challenge to the industry due to the limitations of existing treatment technologies and the potential negative environmental impacts of releasing insufficiently treated water to the environment. Currently, produced waste water from oil and gas operations is injected into deep disposal wells, which raises concerns over drinking water contamination and potential seismic implications. The increasing demand and decreasing availability of fresh water presents a significant concern to the economy and the environment.

Most produced water is a salt brine that is dominated by sodium chloride. Various technologies have been developed for water desalination and purification over past several decades. The commercially available desalination techniques can be grouped into two main categories: membrane desalination (reverse osmosis and forward osmosis) and thermal desalination (multi-stage flash and multi-effect desalination). Reverse osmosis is a form of pressurized filtration in which the filter is a semi-permeable membrane that allows water to pass through. Membrane-based seawater desalination is presently limited by significant specific energy consumption, high unit cots, and environmental impacts including greenhouse gas emissions and organism impingement through intakes. Multi-stage flash came into practice in the early 1960s and became popular due to its reliability and simplicity. The most important disadvantage of multi-stage flash is the relatively higher energy consumption which renders multi-stage flash competitive only when energy costs are very low.

The other major thermal desalination technology is multi-effect distillation which consists of a series of stages in which evaporation and condensation occur in a decreasing pressure (temperature) order. The heat of condensation of steam in each stage is recovered to generate more steam at a lower pressure and temperature. Compared to multi-stage flash, the significant increase in heat transfer area in the multi-stage distillation in addition to the thermodynamic superiority results in a very low temperature drop per stage/effect (1.5-2.5° C.). As such, multi-stage distillation systems are able to incorporate a large number of effects of 8-16 in typical large plants. The performance ratio is generally higher than the multi-stage flash systems. Unlike multi-stage flash, the multi-effect distillation process usually operates as a once-through system and the absence of recirculation of large brine masses significantly reduces pumping requirements.

Currently, both thermal and membrane based desalination technologies are best suited for water sources with relatively low total dissolved solids (TDS), with typical salt concentrations less than 70,000 ppm. In fact, the majority of the desalination plants are designed for treatment of seawater. As such, the application of the existing commercially available membrane-based and thermal desalination technologies to water sources with higher TDS concentrations will lead to operational problems such as fouling and corrosion as well as lower efficiencies.

In contrast, freeze-desalination processes are naturally well suited for such low quality feed streams because pure ice (water) crystals can be produced even in highly concentrated brines. Currently, there are three major freeze-desalination technologies; namely direct-contact, indirect-contact and vacuum freezing desalination. However, each of these technologies has its own deficiencies which hinders their wide spread use compared to thermal and membrane based methods.

In direct contact systems, a liquid refrigerant is injected into the brine and freezing occurs as the refrigerant absorbs heat from the brine upon vaporization. Direct contact freezing offers very large heat transfer coefficients, however, the purified water contains excessive amounts of refrigerant that are hard to separate due to hydrate formation. In the indirect contact systems, a solid surface separates the refrigerant from the brine, thereby preventing the diffusion of the refrigerant into the purified water. Several indirect contact systems have been developed including layer growth freezing on stationary or rotating surfaces, dynamic layer growth, and suspension crystallization. However, each of the above methods has its own deficiencies; the layer growth systems require large equipment volumes and complex moving mechanisms to resolve the slow crystallization rate and to facilitate ice separation form the cold surfaces. The major drawbacks of the dynamic layer growth systems are large system size and entrainment of the salts in the ice resulting in low quality purified water. The suspension freeze systems suffer from lack of effective control of nucleation and complex system design.

The vacuum freeze systems use the cooling effect of evaporating water under vacuum to create ice formation. In other words, evaporation and freezing occur simultaneously under vacuum. However, the compression of low pressure and low density vapor in the vacuum freeze systems requires a significant amount of energy that negatively impacts the economy of desalination. Moreover, in vacuum freeze systems diffusion of dissolved gases from the brine into the vapor usually leads to reduced water quality.

In view of the deficiencies in the current desalination and waste water processing technologies, there is a significant need for a desalination technology capable of handling highly concentrated water with acceptable energy efficiency and cost-competitiveness.

SUMMARY OF THE INVENTION

In one embodiment, the present invention includes a method for desalinating a feed brine using a single-stage freezing process, where the feed brine includes a salt dissolved in water. In this embodiment, the method begins with the steps of providing a source of cooled intermediate-cold-liquid (ICL), introducing the feed brine and the cooled ICL to a crystallization tank, and contacting the feed brine with the ICL for a time sufficient to form a slurry of ice, brine, and ICL. The method continues with the steps of separating the ICL, ice and brine, and returning the separated ICL to the source of cooled ICL tank. The method concludes with the steps of passing the separated brine to the crystallization tank, and melting the separated ice to form desalinated water.

In another aspect, the present invention provides a method for desalinating a feed brine using a two-stage freezing process, wherein the feed brine includes a salt dissolved in water. In this embodiment, the method begins with the steps of providing a source of cooled intermediate-cold-liquid (ICL), introducing the feed brine and the cooled ICL to a first stage freezing tank, and contacting the feed brine with cooled ICL for a time sufficient to form a first slurry of ice, brine, and ICL within the first stage freezing tank. The method continues with the steps of separating the ICL, ice and brine of the first slurry of ice, brine and ICL in a first wash column, moving the separated ice to a first stage melting tank to form a first volume of desalinated liquid water, and separating the ICL from the brine in a first stage ICL-brine separator. The method concludes with the steps of moving the separated brine to a second stage freezing tank, and contacting the separated brine with cooled ICL for a time sufficient to form a second slurry of ice, brine and ICL within the second stage freezing tank.

In yet another embodiment, the present invention provides a method for desalinating a feed brine using a freezing process, wherein the feed brine includes a salt dissolved in water. In this embodiment, the method includes the steps of adding the feed brine to a crystallization tank, adding a cooled intermediate-cold-liquid (ICL) to the crystallization tank, and holding the feed brine in the crystallization tank with the cooled ICL for a time sufficient to form a slurry of ice, ICL, and brine within the crystallization tank. The method continues with the steps of separating the ice from the ICL and brine and melting the separated ice to produce desalinated liquid water. The method concludes with the steps of separating solid salt from the brine, and returning any liquid brine and ICL to the crystallization tank.

DETAILED DESCRIPTION

Figure 1:
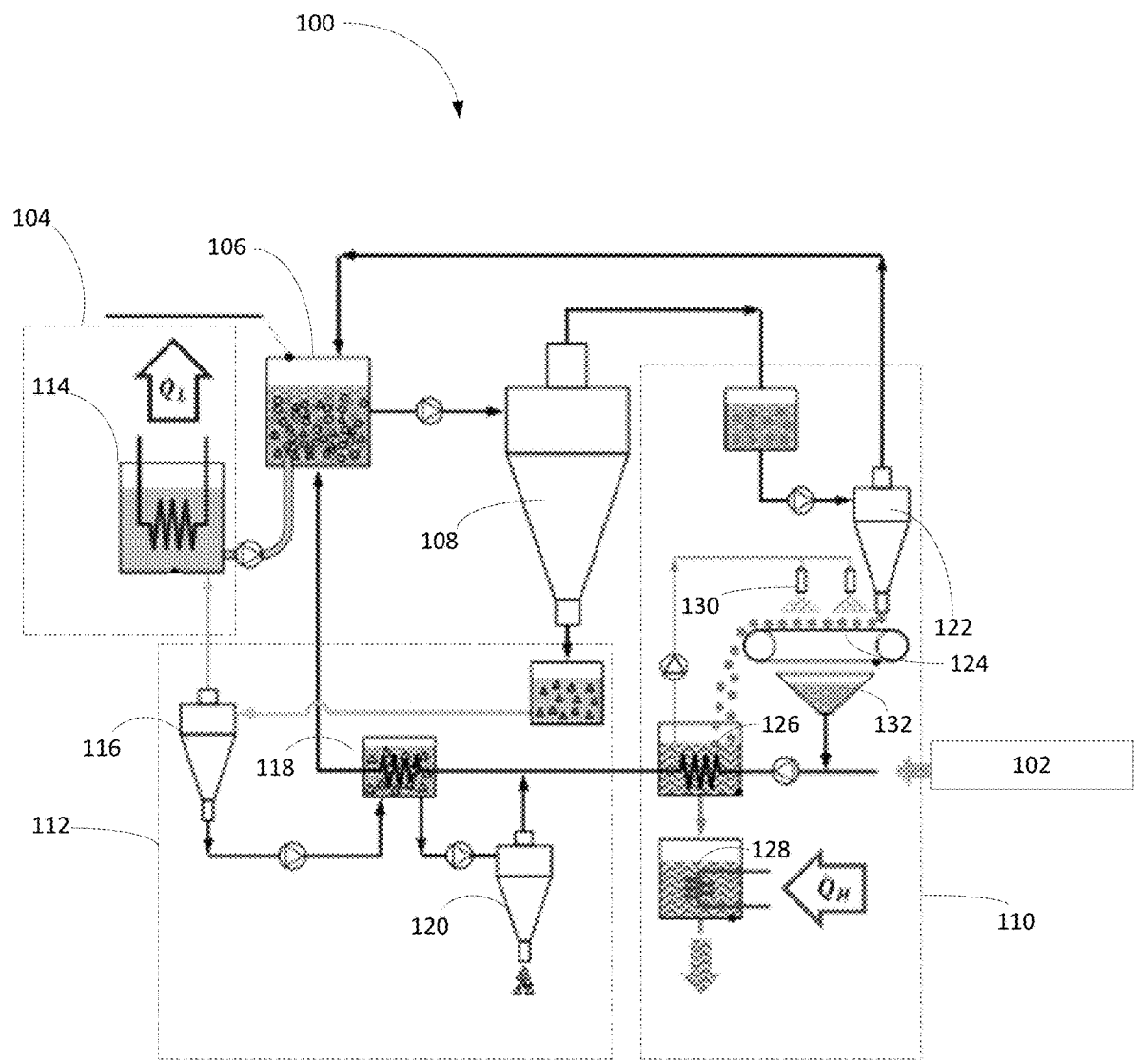
FIG. 1 is a schematic diagram of a water treatment process carried out in accordance with an exemplary embodiment.

To address the shortcomings in the prior art, the various embodiments of the present disclosure provide a novel zero-liquid discharge eutectic-freeze desalination technology that is particularly well suited for the treatment of highly concentrated brines produced in the industrial and oil and gas sectors. In particular, the disclosed system takes advantage of the excellent heat transfer performance of direct contact freezing systems without being affected by dissolution of the refrigerant in the purified water. The combination of superior heat transfer with high quality purified water and competitive desalination economy makes the disclosed freeze desalination technology an attractive solution for desalination of highly concentrated brines produced in a variety of industries, including but not limited to the oil and gas industry and reject brine management.

Before further describing various embodiments of the present disclosure in more detail by way of exemplary description, examples, and results, it is to be understood that the embodiments of the present disclosure are not limited in structure and application to the details as set forth in the following description. The embodiments of the present disclosure are capable of being practiced or carried out in various ways not explicitly described herein. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description. While the present disclosure has been described in terms of particular embodiments, it will be apparent to those of skill in the art that variations may be applied to the apparatus and/or methods and in the steps or in the sequence of steps of the methods described herein without departing from the concept, spirit, and scope of the inventive concepts as described herein. All such similar substitutes and modifications apparent to those having ordinary skill in the art are deemed to be within the spirit and scope of the inventive concepts as disclosed herein.

All patents, published patent applications, and non-patent publications referenced or mentioned in any portion of the present specification are indicative of the level of skill of those skilled in the art to which the present disclosure pertains, and are hereby expressly incorporated by reference in their entirety to the same extent as if the contents of each individual patent or publication was specifically and individually incorporated herein.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

As utilized in accordance with the apparatus, methods and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the terms "at least one" or "plurality" will be understood to include one as well as any quantity more than one, including but not limited to, 2, 3, 4, 5, 6, 7, 8, 9, 10, 15, 20, 30, 40, 50, 100, or any integer inclusive therein, and/or any range described herein. The terms "at least one" or "plurality" may extend up to 100 or 1000 or more, depending on the term to which it is attached; in addition, the quantities of 100/1000 are not to be considered limiting, as higher limits may also produce satisfactory results. In addition, the use of the term "at least one of x, y and z" will be understood to include x alone, y alone, and z alone, as well as any combination of x, y and z.

Where the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "a, b, c, or combinations thereof" is intended to include at least one of: a, b, c, ab, ac, bc, or abc, and if order is important in a particular context, also ba, ca, cb, cba, bca, acb, bac, or cab. Continuing with this example, expressly included are combinations that contain repeats of one or more item or term, such as bb, aaa, aab, bbc, aaabcccc, cbbaaa, cababb, and so forth. The skilled artisan will understand that typically there is no limit on the number of items or terms in any combination, unless otherwise apparent from the context.

Throughout this application, the terms "about" and "approximately" are used to indicate that a value includes the inherent variation of error for the composition, the method used to administer the composition, or the variation that exists among the objects, or study subjects. As used herein the qualifiers "about" or "approximately" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example. The terms "about" or "approximately", where used herein when referring to a measurable value such as an amount, a temporal duration, thickness, width, length, and the like, is meant to encompass, for example, variations of +20% or +10%, or +5%, or +1%, or +0.1% from the specified value, as such variations are appropriate to perform the disclosed methods and as understood by persons having ordinary skill in the art. As used herein, the term "substantially" means that the subsequently described event or circumstance completely occurs or that the subsequently described event or circumstance occurs to a great extent or degree. For example, the term "substantially" means that the subsequently described event or circumstance occurs at least 75% of the time, at least 80% of the time, at least 90% of the time, at least 95% of the time, or at least 98% of the time.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-30 therefore includes 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30, as well as sub-ranges within the greater range, e.g., for 1-30, sub-ranges include but are not limited to 1-10, 2-15, 2-25, 3-30, 10-20, and 20-30. Reference to a range of 1-50 therefore includes 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30, etc., up to and including 50. Reference to a series of ranges includes ranges which combine the values of the boundaries of different ranges within the series. Thus, to illustrate reference to a series of ranges, for example, a range of 1-1,000 includes, but is not limited to, 1-10, 2-15, 2-25, 3-30, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 1 mm to 10 m therefore refers to and includes all values or ranges of values, and fractions of the values and integers within said range, including for example, but not limited to, 5 mm to 9 m, 10 mm to 5 m, 10 mm to 7.5 m, 7.5 mm to 8 m, 20 mm to 6 m, 15 mm to 1 m, 31 mm to 800 cm, 50 mm to 500 mm, 4 mm to 2.8 m, and 10 cm to 150 cm. Any two values within the range of 1 mm to 10 m therefore can be used to set lower and upper boundaries of a range in accordance with the embodiments of the present disclosure.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The inventive concepts of the present disclosure will be more readily understood by reference to the following examples and embodiments, which are included merely for purposes of illustration of certain aspects and embodiments thereof, and are not intended to be limitations of the disclosure in any way whatsoever. Those skilled in the art will promptly recognize appropriate variations of the apparatus, compositions, components, procedures and method shown below.

Turning to FIG. 1, shown therein is a schematic diagram illustrating an inventive water treatment process 200 carried out in accordance with an exemplary, non-limiting, embodiment of a water treatment system 100. Generally, the treatment process 200 makes use of a water-immiscible intermediate-cold-liquid (ICL) to freeze water, which is then separated from the ice, precipitated salts and remaining liquid brine. The ice can be melted to produce purified water, while the ICL is separated from brine and recirculated and cooled through a refrigeration cycle. The system can be operated in both "zero-liquid" output mode, in which the only liquid produced by the system is purified, desalinated water, or partial freeze mode, where a fraction of the water in the input brine is recovered by freezing. In zero-liquid output operation, salt and other contaminants are removed from the system as solids for facilitated disposal or downstream processing.

The treatment system 100 generally includes an untreated brine feed source 102, a refrigerated ICL source 104, a main crystallization tank 106, a primary separator 108, a water-brine separation module 110, and an ICL-brine separation module 112. The ICL source 104 includes an ICL tank 114 that contains a suitable, refrigerated ICL. Suitable ICLs include silicone-based fluids that are immiscible with water and present low health, safety and environmental risks. Some main classes of stable coolants that are liquids at a room temperature include silicate-ester (SE), silicones, and fluorinated liquids (PFC, PFE, HFE, FK). In some applications, segregated hydrofluoroethers (HFEs) available from the 3M Company as Novec 7000-series fluids can be used as the ICL.

The ICL is cooled within the ICL tank 114 with an external refrigeration system or heat exchanger. In some applications, the ICL tank 114 is cooled using solar-driven absorption ammonia refrigeration, which permits refrigeration of the ICL without connection to an established electrical grid. In exemplary embodiments, the ICL is cooled to about −30° C. within the ICL tank 114.

The refrigerated ICL is injected into the main crystallization tank 106 together with brine streams from the untreated brine feed source 102 and the brine recovered from the water-brine separation module 110 and the ICL-brine separation module 112. In exemplary embodiments, the untreated brine is precooled to a temperature of about 0° C. before it is injected into the main crystallization tank 106, as described below.

In the main crystallization tank 106, cold ICL absorbs thermal energy from the brine, while maintaining immiscibility with the brine. The average temperature within the main crystallization tank 106 is maintained at about −24° C. by adjusting the flow rate of the cold ICL relative to the untreated input brine. In some embodiments, the ICL flow rate is an order of magnitude greater than the brine flow rates entering the main crystallization tank 106. In some applications, the main crystallization tank 106 includes a paddle, stirrer or other agitation system that encourages good mixing between the ICL and the brine. In other applications, the main crystallization tank 106 is configured such that the injection of the ICL and brines produces sufficient mixing without additional agitation. Nozzles and manifolds may be used to more equally distribute the ICL and brine within the main crystallization tank 106.

As the injected ICL comes in contact with the brine, both salt and ice crystals form. The ice-ICL-salt-brine mixture is pumped or otherwise moved from the main crystallization tank 106 to the primary separator 108. In some embodiments, the primary separator 108 is a cyclonic separator that induces a rotation of the ice-ICL-salt-brine mixture. Alternatively, hydraulic or mechanical wash columns can be employed to separate the ice from the slurry. As shown in FIG. 1, when ICL has a greater density than the brine, the heavier salt-ICL slurry exits from the bottom of the primary separator 108 and the lighter ice-brine slurry leaves from the top of the primary separator 108. Within the salt-ICL slurry, the brine component may be present completely or partially as hydrohalite crystals. The lighter ice-brine slurry is a mixture of purified water ice crystals carried in a brine solution.

The cooled, separated salt-ICL slurry is provided by pumping or other means to the ICL-brine separation module 112. The ICL-brine separation module 112 includes an ICL-brine separator 116, a hydrohalite heat exchanger 118, and a salt-brine separator 120. Although the exemplary embodiments are not so limited, in FIG. 1 the ICL-brine separator 116 and the salt-brine separator 120 are each cyclonic separators that mechanically separate feed components based on density. In the ICL-salt separator 116, the ICL is separated from the hydrohalite and provided directly or indirectly to the ICL tank 114 for refrigeration. The immiscibility and lower density of the ICL than the hydrohalite promotes good separation from the hydrohalite.

The hydrohalite is then provided to the hydrohalite heat exchanger 118, where it absorbs heat from the feed brine to the main crystallization tank 106. This precools the feed brine to the main crystallization tank 106, while warming the hydrohalite. It will be noted that the hydrohalite heat exchanger 118 is a closed system in which the feed brine to the main crystallization tank 106 is not in direct contact with the hydrohalite. The hydrohalite heat exchanger 118 can use immersed coils, shell and tube, or any other type of heat exchangers that maintains the separation of the hot and cool fluids while permitting the transfer of heat between the fluids. Upon receiving heat, the hydrohalite dissociates into a mixture of pure salt and saturated brine.

From the hydrohalite heat exchanger 118, the salt-brine slurry is passed to the salt-brine separator 120. In exemplary embodiments, the salt-brine separator 120 is a cyclonic separator in which the heavier solid salt particles are separated from the lighter liquid brine. The liquid brine is directed into the feed brine to the main crystallization tank 106. The solid salt particles are discharged as a solid product for disposal or downstream processing. Although the solid particles are expected to be primary sodium chloride solids, it will be appreciated that the solid particles may also include other solid minerals and contaminants.

Turning to the ice-brine separation module 110, the ice-brine slurry from the primary separator 108 is provided by pumping or other means to an ice-brine separator 122. In exemplary embodiments, the ice-brine separator 122 is a cyclonic separator in which the lighter solid ice particles are separated from the heavier liquid brine. The liquid brine is recirculated as feed brine to the main crystallization tank 106. The solid ice crystals are melted to provide purified water.

In the embodiment depicted in FIG. 1, the ice crystals are discharged from the ice-brine separator 122 onto a conveyor belt 124, which discharges the ice crystals into a first melting tank 126. The first melting tank 126 is configured as a heat exchanger that precools brine from the untreated brine feed source 102. The warm untreated brine melts at least a portion of the ice crystals to produce purified liquid water. A portion of the purified liquid water can be provided to a wash array 130 that is configured to disperse purified liquid water over the ice crystals on the conveyor belt 124. Alternatively, ICL at temperatures below 0° C. can be used to wash the ice without melting it. Also, the condenser compartment of the refrigeration system can be placed in the ice melting tank. This arrangement provides the required heat for melting the ice and also lowers the condenser temperature, thereby improving the coefficient of performance of the refrigeration system. The purified wash water or the ICL used for washing removes residual brine from the exterior of the ice crystals. The waste water from the wash array 130 and conveyor belt 124 is captured by a catch basin 132 and directed into the brine feed line. The optional wash array 130 ensures a higher degree of purity of the ice crystals in the first melting tank 126. Purified, desalinated liquid water is produced from the melting tank 126.

It will be appreciated that the first melting tank 126 and the second melting tank is configured as a heat exchanger. The heat exchanger 126 can be configured as immersed coils, shell and tube, or any other type of heat exchangers that maintain the separation of the hot and cool fluids while permitting the transfer of heat between the fluids. In some embodiments, the liquid water and ice from the first melting tank 126 is provided to a second melting tank 128, where an external heat source is used to raise the temperature of the water to above the melting point. For example, the hot fluid used in the second melting tank 128 can be captured from the compression or condensing stages of the refrigeration cycle used to cool the ICL tank 114.

Figure 2:
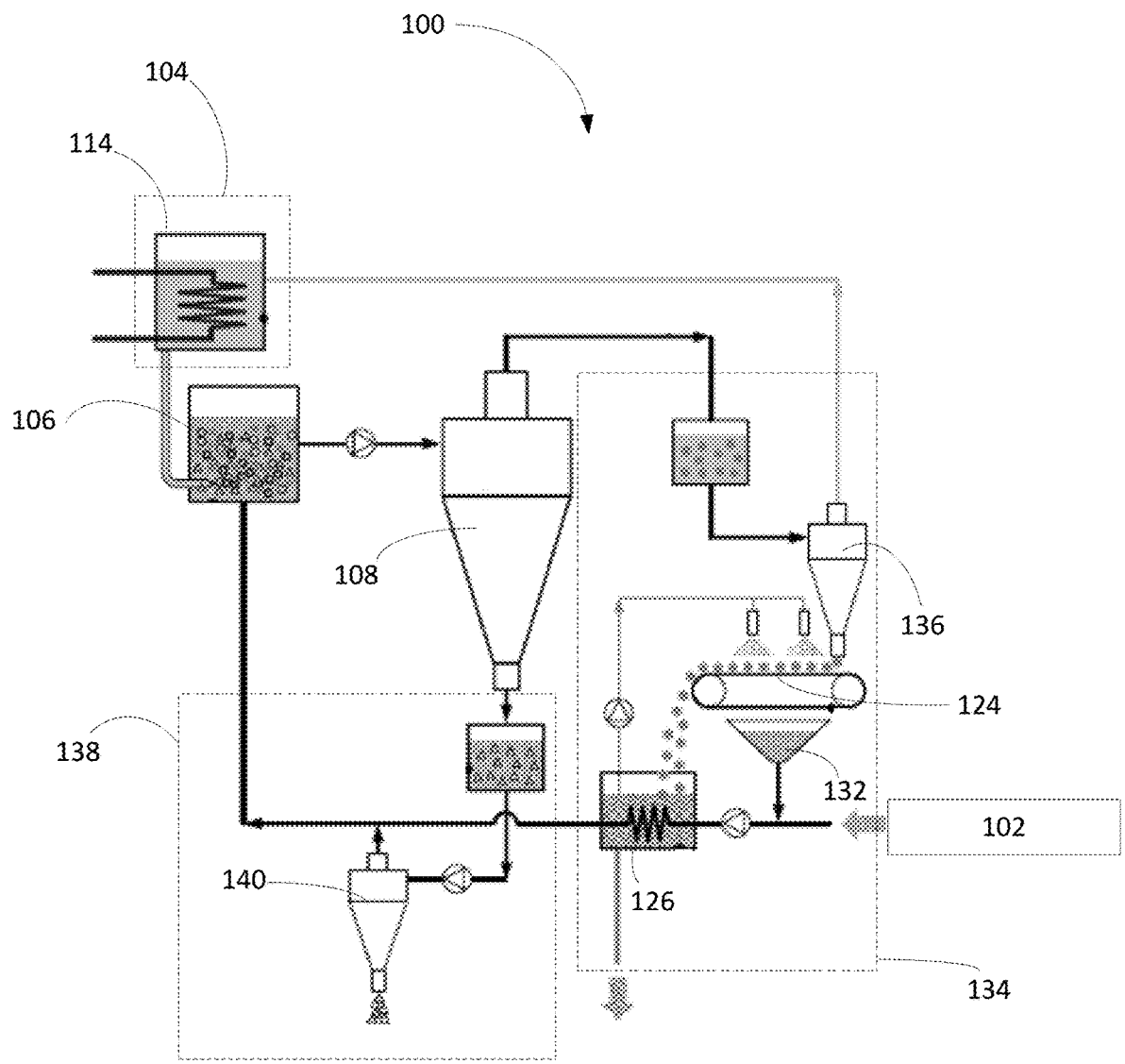
FIG. 2 is a schematic diagram of a water treatment process carried out in accordance with an alternate embodiment.

Turning to FIG. 2, shown therein is an alternate embodiment of the water treatment system 100. Depending on the selected ICL and the characteristics of the wastewater brine, the ice-ICL-salt-brine mixture may separate within the primary separator 108 into an ice-ICL slurry and a salt-brine slurry. In this configuration, the ice-ICL slurry is provided to an ice-ICL separation module 134 that includes an ice-ICL separator 136 in addition to the conveyor belt 124, wash array 130 and first melting tank 126. The ice-ICL separator 136 separates (through cyclonic or other mechanical separation mechanism) the heavier ice crystals from the lighter ICL liquid. The ICL liquid is pumped back to the ICL tank 114, while the ice crystals are deposited on the conveyor belt 124 to be washed with purified water from the first melting tank 126 or ICL at temperatures below 0° C. The washed solution is captured by the catch basin 132 and added to the feed brine line.

The salt-brine slurry produced by the primary separator 108 is passed to a salt-brine separation module 138 that includes a salt-brine separator 140. The salt brine separator 140 can be configured as a cyclonic separator that separates the lighter brine fluids from the heavier salt crystals. The lighter brine fluids are passed to the brine feed line while the solid salt crystals are discharged for disposal or downstream processing.

Figure 3:
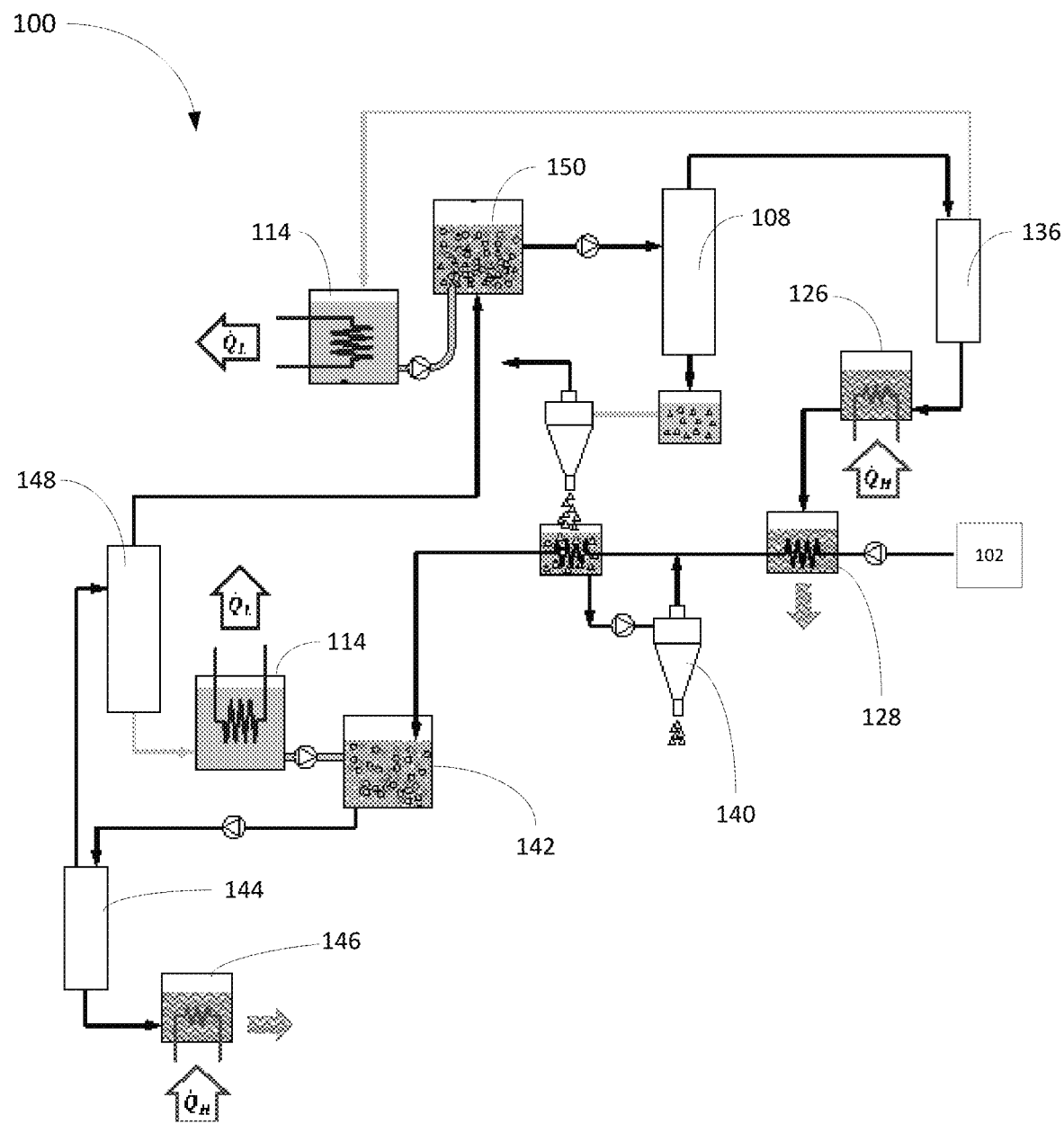
FIG. 3 is a schematic diagram of a water treatment process carried out in accordance with an alternate two-stage freezing embodiment.

Turning to FIG. 3, shown therein is an alternative embodiment in which the freezing process is accomplished in two stages. Each stage is driven by a separate refrigeration system. The rationale for developing the two-stage freeze system is to breakdown the cooling load into two parts: a relatively high temperature freezing and a relatively low temperature freezing. By extracting the ice from the input brine at a relatively higher temperature, the refrigeration system driving the first stage freezing process can operate between a smaller temperature gap between the evaporator and condenser. This dramatically improves the energy efficiency of the refrigeration process due to increased Coefficient of Performance (COP) of the first stage refrigeration system. Overall energy savings up to 30% can be achieved compared to the single-stage freeze system.

In the first stage of freezing, the input brine is cooled to temperatures within a range from about −5 C to about −20 C in a first stage freezing tank 142 depending on the brine composition. In general, higher levels of total dissolved solids in the brine will require lower freezing temperatures. During this process, only ice crystals are formed and salt-hydrate formation is negligible. The ice-ICL-brine slurry from the first stage freezing tank 142 is introduced into a first wash column 144, where the solid ice is separated from the liquid ICL-brine mixture. The washed ice is carried to a first stage melting tank 146, where it is melted and recovered as fresh water. The cold energy of the ice in the first stage melting tank 146 can be recovered for cooling the condenser of the refrigeration system. The ICL-brine mixture discharged from the first wash column 144 is carried to a first stage ICL-brine separator 148, where the ICL and brine are separated by density and discharged through separate outlets. The separated ICL is recirculated through the refrigeration system and directed back to the first stage freezing tank 142.

The output brine from the first stage ICL-brine separator 148 is more concentrated than the input brine because a portion of the water has already been removed. The concentrated brine is introduced to the second stage freezing tank 150 for the second stage of freezing. In the second stage freezing tank 150, the temperature is further decreased to temperatures within a range from about −24 C to −35 C. At these temperatures, both ice crystals and salt-hydrates are formed. Depending on the cooling temperature in the second stage freezing tank 150, the output from the second stage freezing tank 150 may be composed primarily, or entirely, of frozen solids such that all the impurities are discharged in solid phase, or where the output consists of only a small stream of highly concentrated liquid discharge.

The ice, salt-hydrates and ICL from the second stage freezing tank 150 are separated in the same manner explained above with regard to the single stage systems depicted in FIGS. 1-2, depending on the composition of the streams leaving the primary separator 108. As depicted in FIG. 3, the salt-brine-ICL slurry from the second stage freezing tank 150 is delivered to the primary separator 108. In this embodiment, an ice-ICL slurry is discharged from the top of the primary separator 108 and provided to the ice-ICL separation module 134 as depicted in the embodiment FIG. 2. The ice-ICL separation module 134 may include the ice-ICL separator 136, which fees the first melting tank 126 and optional second melting tank 128. The ice-ICL separator 136 separates (through cyclonic or other mechanical separation mechanism) the heavier ice crystals from the lighter ICL liquid. The ICL liquid is pumped back to the ICL tank 114. In the variation depicted in FIG. 3, the ice crystals sent directly to the first melting tank 126 without the use of a conveyor belt. It will be appreciated that the conveyor belt 124, wash array 130 and catch basin 132 can also be incorporated into the embodiment depicted in FIG. 3.

The salt-brine slurry produced by the primary separator 108 is passed to the salt-brine separation module 138, which includes the salt-brine separator 140. The salt brine separator 140 can be configured as a cyclonic separator that separates the lighter brine fluids from the heavier salt crystals. The lighter brine fluids are passed to the brine feed line back to the second stage freezing tank 150, while the solid salt crystals are discharged for disposal or downstream processing. Although the output from the primary separator 108 depicted in FIG. 3 follows the basic processing path depicted in FIG. 2, it will be appreciated that in some applications, the output from the primary separator 108 follows the processing steps depicted in FIG. 1 such that that an ice-brine slurry is discharged to a water brine separation module 110 and the ICL-brine mixture is directed to an ICL-brine separation module 112.

The two-stage freeze process is particularly advantageous for relatively lower brine concentrations (TDS<200,000 ppm). Above 200,000 ppm, there may be smaller differences between the energy efficiency of the single-stage and two-stage designs, mainly because no significant freezing occurs at temperatures above −20 C for such high concentration brines.

Figure 4:
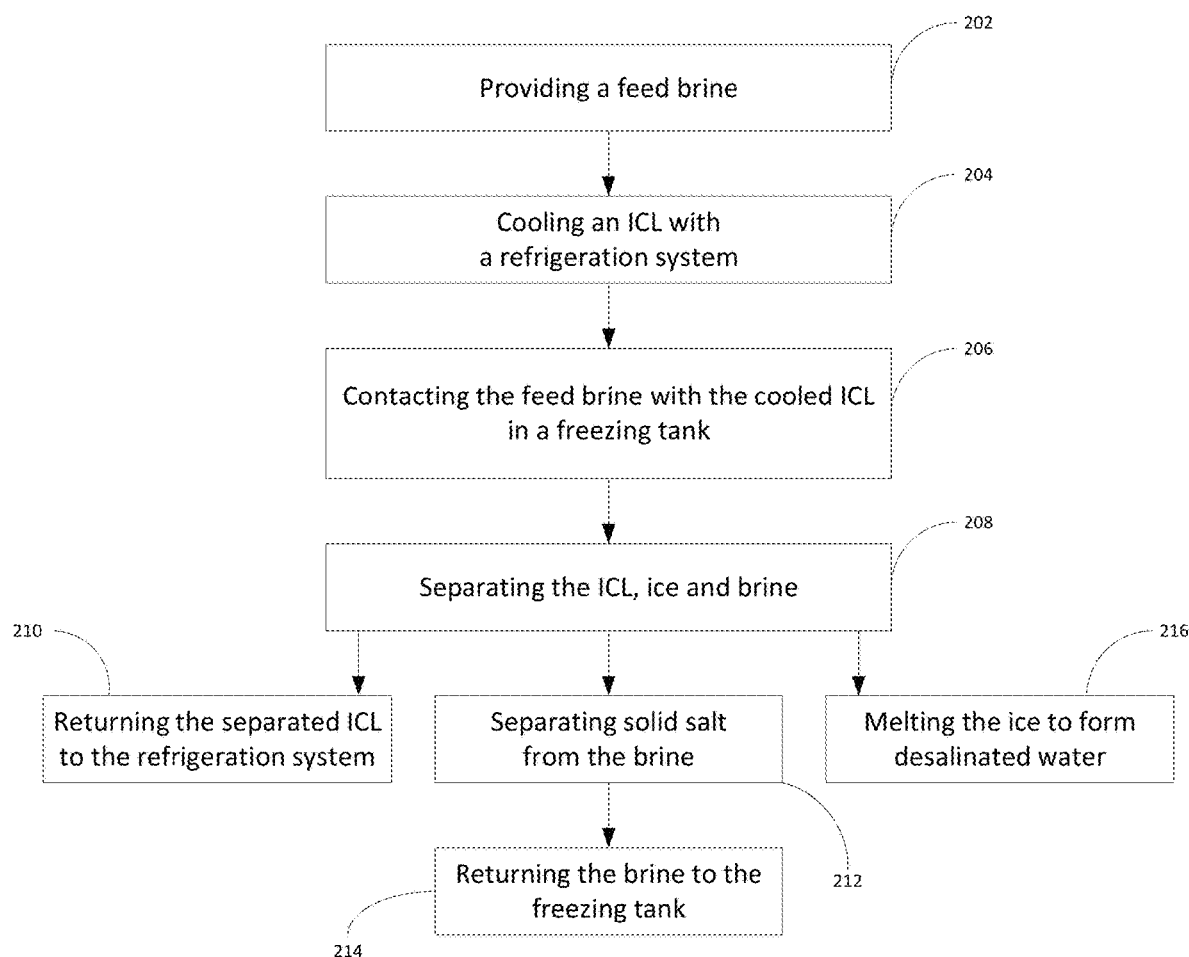
FIG. 4 is a process flowchart for a eutectic freeze desalination method using an intermediate-cold-liquid.

Turning to FIG. 4, shown therein is a process flow diagram for a freeze desalination method 200. The method 200 presents a general description of the processes that can be practiced using the systems depicted in FIGS. 1-3. It will be appreciated that the method 200 presents an overview of the desalination methods and many of the individual steps have been omitted from the diagram presented in FIG. 4.

Beginning at step 202, the feed brine 102 is provided to the water treatment system 100. At step 204, the intermediate-cold-liquid (ICL) is cooled to provide the refrigerated ICL source 104. At step 206, the feed brine 102 is contacted with the refrigerated ICL in a freezing or crystallization tank 106 for a time sufficient and under appropriate conditions to form ice crystals within the tank. Next, at step 208, the ice crystals are separated from the ICL and brine. In certain applications, the interaction between the brine and the ICL may have formed hydrohalites, which are also separated from the ice crystals.

At step 210, the ICL is separated from the other constituent components and returned to the refrigerated ICL source 104. The ICL can be separated from the other components through an ICL-brine separation module 112 or an ice-ICL separation module 134. At step 212, the solid salt crystals are separated from the brine. The salt can be separated from the brine with the salt-brine separator 120, 140. The solid salt can be discarded or used in downstream processes. At step 214, the remaining brine is returned for further processing in the main crystallization tank 106 (in a single stage process), or to the first stage freezing tank 142 (in a two stage process).

At step 216, the separated ice crystals a melted to form desalinated liquid water. The melting process can take place through use of the first melting tank 126 alone, or in combination with the second melting tank 128, wash array 130 and catch basin 132. It will be appreciated that in certain embodiments, the separated ice crystals can simply be transferred to a storage container or facility to be held at freezing temperatures, or at temperatures that allow the ice to melt over time to form desalinated water.

Thus, the embodiments of the present disclosure are well adapted to carry out the objects and attain the ends and advantages mentioned above as well as those inherent therein. While the inventive system and method have been described and illustrated herein by reference to particular non-limiting embodiments in relation to the drawings attached thereto, various changes and further modifications, apart from those shown or suggested herein, may be made therein by those of ordinary skill in the art, without departing from the spirit of the inventive concepts

What is claimed is:

1. A method for desalinating a feed brine using a two-stage freezing process, wherein the feed brine includes a salt dissolved in water, the method comprising the steps of:
   providing a source of cooled intermediate-cold-liquid (ICL);
   introducing the feed brine and the cooled ICL to a first stage freezing tank;
   contacting the feed brine with cooled ICL for a time sufficient to form a first slurry of ice, brine, and ICL within the first stage freezing tank;
   separating the ICL, ice and brine of the first slurry of ice, brine and ICL in a first column;
   moving the separated ice to a first stage melting tank to form a first volume of desalinated liquid water;
   separating the ICL from the brine in a first stage ICL-brine separator;
   moving the separated brine to a second stage freezing tank; and
   contacting the separated brine with cooled ICL for a time sufficient to form a second slurry of ice, brine and ICL within the second stage freezing tank.

2. The method of claim 1, further comprising a step of separating the ICL and ice from the brine of the second slurry of ice, brine and ICL in a primary separator.

3. The method of claim 2, further comprising a step of separating the ICL from the ice from the second slurry of ice, brine and ICL in an ice-ICL separator.

4. The method of claim 3, further comprising the step of moving the separated ice from the second slurry of ice, brine and ICL into a second stage melting tank to form a second volume of desalinated liquid water.

5. The method of claim 1, wherein the step of contacting the separated brine with cooled ICL further comprises contacting the separated brine with cooled ICL for a time and at a temperature sufficient to form a second slurry of ice, hydrohalites, brine and ICL within the second stage freezing tank.

6. The method of claim 5, further comprising a step of separating the ICL, ice and hydrohalites from the brine of the second slurry of ice, hydrohalites, brine and ICL in a primary separator.

7. The method of claim 6, further comprising a step of separating the ICL from the ice and hydrohalites from the second slurry of ice, hydrohalites, brine and ICL in an ice-ICL separator.

8. The method of claim 7, further comprising the step of moving the separated ice from the second slurry of ice, hydrohalites, brine and ICL into a second stage melting tank to form a second volume of desalinated liquid water.

* * * * *